United States Patent [19]
Kobayashi

[11] 3,809,466
[45] May 7, 1974

[54] MOTION PICTURE CAMERA WITH ELECTRONIC CIRCUITRY FOR SINGLE-FRAME PHOTOGRAPHY

[75] Inventor: Katsumi Kobayashi, Tokyo, Japan

[73] Assignee: Kabushiki Kaisha Yashica, Tokyo-to, Japan

[22] Filed: Apr. 9, 1973

[21] Appl. No.: 349,277

[30] Foreign Application Priority Data
Apr. 20, 1972 Japan................................ 47-46155

[52] U.S. Cl.................. 352/169, 352/137, 352/121, 352/177
[51] Int. Cl. ............................................ G03b 21/38
[58] Field of Search ........... 352/121, 137, 169, 174, 352/176, 177, 178, 179, 141

[56] References Cited
UNITED STATES PATENTS
3,603,678   9/1971   Anderl................................ 352/169

*Primary Examiner*—Monroe H. Hayes
*Attorney, Agent, or Firm*—Steinberg & Blake

[57] ABSTRACT

A motion picture camera which has a driving motor capable of being turned on and off through a control switch. The latter is in turn regulated by an electromagnet. A selecting switch is provided for selecting single-frame operation, and when the latter operation is selected by the selecting switch the electromagnet is connected to a timing circuit which is automatically regulated after a given timing interval by the timing circuit so as to bring about opening of the control switch and stopping of the motor when a single frame has been exposed.

6 Claims, 7 Drawing Figures 3,809,466

MOTION PICTURE CAMERA WITH ELECTRONIC CIRCUITRY FOR SINGLE-FRAME PHOTOGRAPHY

BACKGROUND OF THE INVENTION

The present invention relates to cameras.

The present invention relates particularly to motion picture cameras.

As is well known, it is possible to operate motion picture cameras in such a way that they can expose only a single frame. The known constructions which have been proposed and are commercially available for bringing about single-frame photography with a motion picture camera are relatively inconvenient for practical purposes particularly because a suitable relay switch is essential when the camera is operated with a remote control unit or with a unit which will regularly expose single frames at given intervals, such as for time-lapse photography. These inconveniences and complexities are required because components such as an electrical circuit for single-frame photography and an electrical circuit for stopping the shutter must be added to the electrical circuit for starting the operation of the camera, with the result that it becomes impossible to provide with conventional constructions of the above type a simple camera-starting switch having only a pair of terminals to be bridged by a single switch blade in order to start the camera. In addition, operation of the relay or the like for the purpose of remote control of the camera or for the purpose of time-lapse photography makes it essential in those cases to use a capacitor of large size in the release circuit, and a capacitor which has a large capacity is not desirable from an economic standpoint.

SUMMARY OF THE INVENTION

It is accordingly a primary object of the present invention to provide a motion picture camera capable of being operated in a single-frame mode while avoiding the above drawbacks.

Thus, it is an object of the present invention to provide a motion picture camera of the above type which can be remotely controlled and which can be used for purposes such as time-lapse photography while at the same time avoiding the necessity of relays by making it possible to start the camera with a simple release switch having only a pair of terminals and a single blade for bridging across these terminals.

In addition, it is an object of the present invention to provide a camera of the above type which requires a capacitor of small size, which is to say of relatively small capacity.

Furthermore, it is an object of the present invention to provide for a camera of the above type an electronic circuit which requires an electromagnet to be energized only for a relatively short interval during single-frame photography.

In sum, it is an object of the present invention to provide a camera composed of simple rugged elements which are relatively inexpensive and which at the same time enable the desired results to be achieved in a manner which is far superior to what has heretofore been possible with conventional cameras.

According to the invention the motion picture camera includes a driving motor and a control switch for stopping the motor when the control switch is in an open position and for permitting the motor to operate when the control switch is closed. This control switch is regulated through an electromagnetic means which is electrically connected with a selecting switch means capable of being placed in a single-frame operating position when single frame operation of the camera is selected. This selecting switch means when operation in a single-frame mode is selected connects the electromagnetic means to a timing circuit means which brings about a response of the electromagnetic means after a given interval suitable for exposure a single frame, so that through this response the electromagnetic means will provide for opening of the control switch and thus stopping of the driving motor after a single frame has been exposed.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
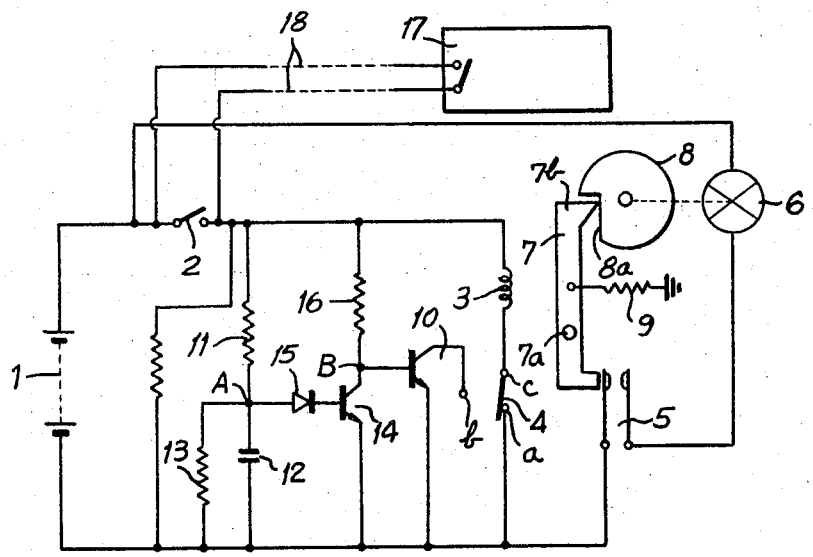
FIG. 1 is a partly schematic wiring diagram of one embodiment of the invention.
Figures 2A, 2B:
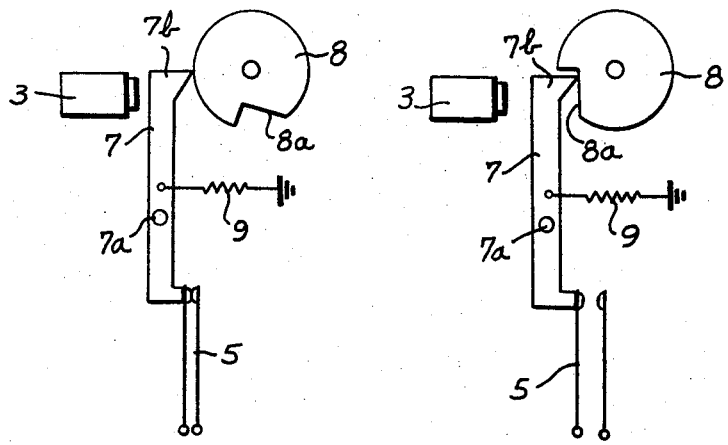
FIGS. 2A and 2B illustrate a control switch means of the invention in association with an electromagnetic means and a cam, the structure being shown in different positions in FIGS. 2A and 2B, respectively.

Referring first to FIG. 1, the circuitry illustrated therein includes a power source 1 in the form of one or more suitable batteries connected in the illustrated circuit to a start-stop switch 2 capable of being closed by the operator in order to start the camera operation. It will be noted that the start-stop switch 2 is a simple switch having only two terminals bridged by a single switch blade in order to close the switch 2. An electromagnetic means 3 is connected through the switch 2 to the power source 1 when the switch 2 is closed. This electromagnetic means 3 is also connected electrically with a selecting switch means 4 capable of being placed in different positions by the operator according to whether continuous or single-frame operation is selected. Thus it will be seen that the components 1-4 are all connected to each other in a series circuit. The components 2-4 are in turn connected in parallel with a second series circuit which includes a control switch means 5, 7 and an electric driving motor 6. The control switch means 5, 7 includes a normally open switch 5 and a lever 7 supported for turning movement on a pin 7a and capable of closing the switch element 5 when the lever 7 swings in a counterclockwise direction, as viewed in FIG. 1, in opposition to the spring 9. The closed position of the control switch means 5, 7 is shown in FIG. 2A which illustrates how the electromagnetic means 3 acts on the end 7b of the lever 7 to close the switch 5, 7.

The selecting switch means 4 includes the terminals a-c. When the switch means 4 bridges across the terminals c and a, the operator has selected a continuous mode of operation while the switch means 4 interconnects the terminals c and b when the operator selects a single-frame mode of operation.

As is schematically illustrated in FIG. 1, the motor 6 drives a cam 8. This cam is mechanically connected with a shutter of the camera. The cam 8 is formed with a notch 8a. The control switch means 5, 7 is shown in its normally open position in FIG. 2B. When the electromagnetic means 3 is energized, the lever 7 swings out of the notch 8a, and with the motor 6 operating as described below, the cam 8 will turn in a clockwise direction, as viewed in FIGS. 2A and 2B. Assuming that the notch 8a has turned beyond the end 7b of the lever 7, then the periphery of the cam 8 will serve to maintain the switch means 5 in its closed position, in opposition to the spring 9, until the cam 8 again reaches the position shown in FIG. 2B. Thus, even if the electromagnet 3 becomes unenergized, as long as the cam 8 has not yet reached the position of FIG. 2B, the switch 5 will remain closed with the opening thereof taking place only when the cam 8 reaches the position of FIG. 2B, so that in this way the shutter can only remain stationary when it is in a predetermined angular position with the motor continuing to operate until the cam 8 reaches the position of FIG. 2B.

The circuitry for single-frame photography, according to the present invention, includes a switching transistor 10 which is connected in series with the power source 1 when the selecting switch means 4 bridges the terminals b and c. This switching transistor 10 forms part of a timing circuit means which includes a delay circuit consisting of the timer resistance 11 and capacitor 12, a discharge resistance 13 being connected in parallel with the capacitor 12, and a diode 15 being connected between the base of a transistor 14 and a junction A between resistor 11 and capacitor 12, for improving the precision of operation. A collector resistance 16 is connected with the transistor 14. The junction A forms the output for the delay circuit 11, 12, while the junction B forms the output for the timing part of the timing circuit means, this output being delivered to the base of the switching transistor 10.

FIG. 1 clearly illustrates schematically a remote control unit 17 connected only through a pair of conductors to the circuit at opposite sides of the switch 2, so that the start-stop switch 2 is connected between the pair of conductors 18, and thus the unit 17 does not require any relay switching structure. This unit 17 may be used for remote control or for time-lapse photography, providing single-frame exposures at given intervals in a well known manner.

With this embodiment of the invention when the switch means 4 interconnects the terminals a and c, the camera will operate in a continuous mode. The electromagnetic means 3 is energized when the start-stop switch means 2 is closed, thus swinging the lever 7 out of the notch 8a, to provide for closing of the normally-open switch 5, 7, and thus starting the operation of the motor 6 which continues to operate to provide for continuous operation of the camera in a well known manner. Upon opening of the start-stop switch 2, the electromagnetic means 3 becomes deenergized, thus releasing the lever 7 with the switch 5 remaining closed until the cam 8 reaches the position of FIG. 2B, so that now the motor 6 will stop with the shutter in a predetermined angular position.

Assuming that the selecting switch means 4 interconnects the terminals b and c, so that the operator has selected operation in a single-frame mode, then the electromagnetic means 3 is also energized upon closing of the start-stop switch 2 and the lever 7 is swung out of the notch 8a, closing the switch 5 and starting the operation of the motor 6. The initial closing of the switch 2 will also energize the timing circuit means and the transistor 10 will initially be in a conductive state resulting from delivery of a potential from the output terminal B upon closing of the start-stop switch 2. However, the energizing of the timing circuit means renders the transistor 14 conductive according to a time constant depending upon the timing resistor 11 and the capacitor 12, so that when the transistor 14 becomes conductive after elapse of a predetermined interval, the potential at the output terminal B drops sharply and transistor 10 is rendered non-conductive. As a result the electromagnetic means 3 is deenergized, and the spring 9 will now swing the lever 7 into engagement with the periphery of the cam 8. This cam will turn until the lever 7 enters the notch 8a and the motor 6 will now stop operating and the shutter will be stopped in a predetermined angular position after completing a single revolution, thus exposing only a single frame.

The interval during which the electromagnetic means 3 is energized may be optionally determined by selecting the magnitude of the resistance of the resistor 11 included in the delay circuit as well as selecting the capacitance of the capacitor 12 or the operating voltage of the transistor 14. Upon opening of the switch 2 upon completion of a single-frame cycle of operation, the electrical charge of capacitor 12 is discharged through the discharge resistance 13.

The timing circuit means is not limited to the embodiment shown in FIG. 1. Thus, FIGS. 3–5 show other possible embodiments of the timing circuit means.

Figure 3:
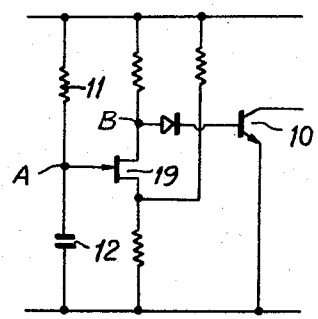
FIGS. 3-5 respectively illustrate different possible embodiments of timing circuits.

Referring to FIG. 3, the output of the delay circuit formed by resistor 11 and capacitor 12 is delivered from the junction A in the form of an emitter signal of the field effect transistor of FET 19, with the switching transistor 10 in this case being also initially conductive when the switch 2 closes and then becoming non-conductive after the predetermined interval for exposure of a single frame under the control of the output signal from the output terminal B at the drain of transistor 19.

Figure 4:
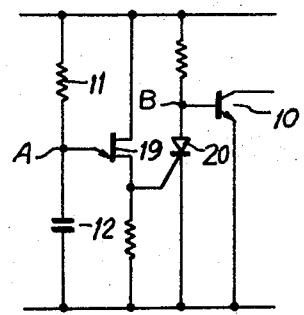

In the embodiment of FIG. 4, the circuitry of FIG. 3 has been further modified to the extent that the source output of FET 19 is applied to the gate of SCR (silicon control rectifier element) 20, with the output terminal B of this circuit for regulation of SCR 20 being connected to the base of the switching transistor 10. This embodiment of FIG. 4 thus operates in the same way as the embodiment of FIG. 3, in that FET 19 upon becoming conductive also renders SCR conductive, with the result that switching transistor 10 becomes non-conductive.

Figure 5:
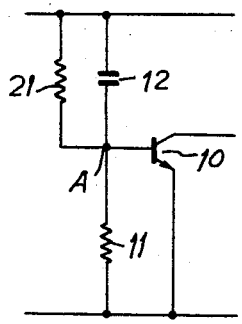

With the embodiment of FIG. 5, the switching transistor 10 takes the form of an element which has a high degree of D.C. amplification with the transistor 10 in this case being directly turned off, or in other words transferring to its non-conductive state, by utilization of a voltage drop at the junction A between capacitor 12 and resistor 11. In the embodiment of FIG. 5 a discharge resistance 21 is used.

Figure 6:
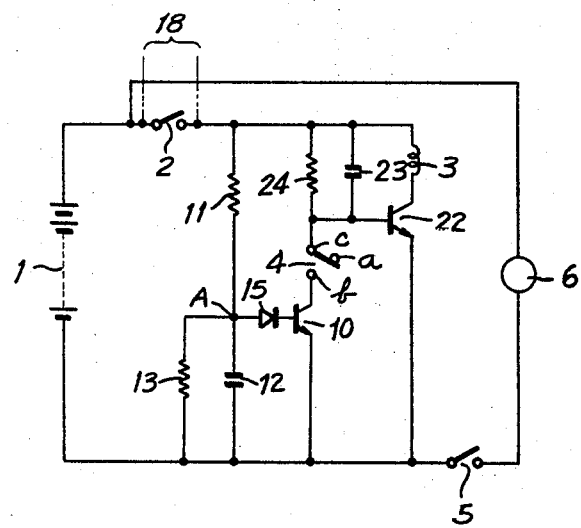
FIG. 6 is a wiring diagram of a further embodiment of a structure according to the present invention.

A further embodiment of the invention which is illustrated in FIG. 6 includes components which are the same as those of FIG. 1 and are designated by the same reference characters. In the embodiment of FIG. 6 the start-stop switch means 2 and the electromagnetic means 3 form part of a circuit for regulation of a transistor 22 which is permanently connected with the electromagnetic means 3 and which is activated so as to become conductive upon application of a base current from a parallel circuit made up of a capacitor 23 and a resistor 24. More specifically, when the start-stop switch means 2 is closed, a transient current will flow through the capacitor 23 when the selecting switch means 4 interconnects the terminals c and a, and thus the transistor 22 becomes conductive as the transient current is supplied thereto in the form of a base current. When the capacitor 23 becomes fully charged, the base current provided by resistor 24 enables the transistor 22 to continue to operate, or in other words to remain conductive, thus bringing about operation in the continuous mode.

As is apparent from the above description of FIG. 1, the energized electromagnetic means 3 will swing the lever 7 out of the notch of the cam 8 so that the switch 5 will close and the motor 6 will operate continuously to bring about continuous operation in the camera. The transistor 22 will be switched to its non-conductive state upon opening of the start-stop switch 2 in order to terminate the continuous photography, as was the case with the embodiment of FIG. 1.

With the embodiment of FIG. 6, when it is desired to operate the camera in a single-frame mode, the switch 2 is closed after the selecting switch means 4 has interconnected the terminals b and c, and thus the transistor 22 will initially be in a conductive state as referred to above in connection with the continuous-mode of operation. Of course, the closing of the selecting switch means 4 across the terminals c and b places the switching transistor 10 in the circuit, but initially the switching transistor 10 is non-conductive, so that the circuit is completed through the initially conductive transistor 22, with the energized electromagnet 3 closing the switch 5 and starting the motor 6 as described above. However, the embodiment of FIG. 6 will through the timing circuit transfer the transistor 10 to its conductive state after elapse of an interval determined by the delay circuit 11, 12, and when the transistor 10 becomes conductive the transistor 22 will transfer to its non-conductive state, thus deenergizing the electromagnet 3 with the camera terminating its operation after exposure of a single frame in the manner described above. In other words, the interval determined by resistor 11 and capacitor 12 is such that the electromagnet 3 can become unenergized before the cam 8 has turned through a complete revolution, but the periphery of the cam 8 will act through the lever 7 on the switch 5 to maintain the latter closed until the shutter has completed a single revolution, so that a single frame will be exposed as described above.

Thus, in accordance with the present invention, a switching transistor is inserted into the energizing circuit of the electromagnetic means through the operation of the selecting switch means, when the latter is placed in a position for selecting single-frame operation, and the timing circuit will then operate upon closing of the start-stop switch 2, so that the interval during which the electromagnetic means 3 remains energized may be optionally controlled by controlling the delay determined by resistor 11 and the capacitor 12. In this way the power consumed from the battery source 1 may be reduced by selecting the duration of energizing of the electromagnetic means 3 to the shortest possible period. In addition, it will be seen that the switch 2 is formed only as a two-terminal switch bridged by a single switch blade, so that the remote control operation or time-lapse photography can be carried out with only a pair of conductors 18. Finally, with the present invention it is possible to use capacitors of relatively small capacity, as contrasted with the prior art devices, so that the structure of the invention involves only low costs.

What is claimed is:

1. In a motion picture camera, an electric driving motor for driving camera components which include the camera shutter, control switch means electrically connected with said motor for energizing the latter when said control switch means is closed and for stopping the operation of said motor when said control switch means is open, electromagnetic means positioned with respect to said control switch means for determining the operation thereof so as to determine the operation of said electric motor, selecting switch means electrically connected with said electromagnetic means for selecting continuous or single-frame operation, and timing circuit means electrically connected with said electromagnetic means through said selecting switch means when the latter is positioned for selection of single-frame operation for controlling said electromagnetic means to bring about stopping of the motor by opening of said control switch means after a single frame has been exposed, said control switch means being a normally open switch means acted upon by said electromagnetic means to be closed when said electromagnetic means is energized, said timing circuit means being electrically connected with said electromagnetic means for deenergizing the latter after an interval which will produce exposure of a single frame, said timing circuit means including a switching transistor electrically connected with said electromagnetic means by said selecting switch means when the latter is positioned to select single-frame operation, and said timing circuit means transferring said transistor from a conductive to a non-conductive state after said interval to then deenergize said electromagnetic means, said timing circuit means including a pair of resistors connected in series and a capacitor connected in parallel with one of said pair of resistors and in series with the other of said pair of resistors, said pair of resistors and capacitor being electrically connected with said transistor for determining said interval.

2. The combination of claim 1 and wherein a second transistor and diode are connected between said resistors and capacitor, on the one hand, and said switching transistor, on the other hand.

3. The combination of claim 1 and wherein said switching transistor has a base connected directly to a junction between said resistors and said capacitor.

4. In a motion picture camera, an electric driving motor for driving camera components which include the camera shutter, control switch means electrically connected with said motor for energizing the latter when said control switch means is closed and for stopping the operation of said motor when said control switch means is open, electromagnetic means positioned with respect to said control switch means for determining the operation thereof so as to determine the operation of said electric motor, selecting switch means electrically connected with said electromagnetic means for selecting continuous or single-frame operation, and timing circuit means electrically connected with said electromagnetic means through said selecting switch means when the latter is positioned for selection of single-frame operation for controlling said electromagnetic means to bring about stopping of the motor by opening of said control switch means after a single frame has been exposed, said control switch means being a normally open switch means acted upon by said electromagnetic means to be closed when said electromagnetic means is energized, said timing circuit means being electrically connected with said electromagnetic means for deenergizing the latter after an interval which will produce exposure of a single frame, a first transistor being permanently connected electrically with said electromagnetic means and a second transistor being electrically connected through said selecting switch means to said first transistor when said selecting switch means selects single-frame operation with said second transistor rendering said first transistor nonconductive when said second transistor is rendered conductive, and a parallel circuit connected to the base of said first transistor, said parallel circuit being made up of a capacitor and a resistor.

5. The combination of claim 4 and wherein said timing circuit means includes a resistor and capacitor connected in series and having between the latter resistor and capacitor a junction electrically connected to a base of said second transistor, and an additional resistor connected to said junction and in parallel across the latter capacitor of said timing circuit means.

6. The combination of claim 5 and wherein a diode is electrically connected between said junction and said base of said second transistor.

\* \* \* \* \*